(12) United States Patent
Tsutsumi et al.

(10) Patent No.: US 7,875,391 B2
(45) Date of Patent: Jan. 25, 2011

(54) LITHIUM ION SECONDARY BATTERY AND METHOD FOR MANUFACTURING SAME

(75) Inventors: Shuji Tsutsumi, Ikoma (JP); Kozo Watanabe, Katano (JP); Mitsuhiro Takeno, Settsu (JP); Mikinari Shimada, Yawata (JP)

(73) Assignee: Panasonic Corporation, Osaka (JP)

( * ) Notice: Subject to any disclaimer, the term of this patent is extended or adjusted under 35 U.S.C. 154(b) by 1372 days.

(21) Appl. No.: 10/569,368

(22) PCT Filed: May 12, 2005

(86) PCT No.: PCT/JP2005/008690

§ 371 (c)(1),
(2), (4) Date: Feb. 24, 2006

(87) PCT Pub. No.: WO2005/117167

PCT Pub. Date: Dec. 8, 2005

(65) Prior Publication Data

US 2006/0281007 A1 Dec. 14, 2006

(30) Foreign Application Priority Data

May 25, 2004 (JP) .............................. 2004-154510

(51) Int. Cl.
*H01M 2/16* (2006.01)
*H01M 6/00* (2006.01)

(52) U.S. Cl. ........................ 429/246; 429/247; 429/251; 29/623.1

(58) Field of Classification Search .......... 429/246–255
See application file for complete search history.

(56) References Cited

U.S. PATENT DOCUMENTS

2003/0224242 A1* 12/2003 Kaito et al. ................... 429/94

(Continued)

FOREIGN PATENT DOCUMENTS

CN 1285959 A1 2/2001

(Continued)

OTHER PUBLICATIONS

English Translation of the Chinese Office Action, issued in Chinese Patent Application No. 2005800010958, dated on Jan. 4, 2008.

*Primary Examiner*—Patrick Ryan
*Assistant Examiner*—Muhammad Siddiquee
(74) *Attorney, Agent, or Firm*—McDermott Will & Emery LLP

(57) ABSTRACT

A lithium ion secondary battery with improved safety against both internal short-circuiting and overcharge is provided. This lithium ion secondary battery includes a positive electrode comprising a composite lithium oxide, a negative electrode, and a non-aqueous electrolyte. At least one of the positive electrode and the negative electrode has a porous film, comprising an inorganic oxide filler and a binder, on the surface facing the other electrode, and the electrode surface having the porous film partially has a protruded part. This protruded part may be a protruded part formed on the porous film itself or a protruded part formed on an electrode mixture layer. Further, a separator can also be incorporated therein. Instead of the above-mentioned porous film, the separator can be provided with a porous film.

7 Claims, 4 Drawing Sheets

U.S. PATENT DOCUMENTS

2005/0053833 A1  3/2005  Hayashida et al.

FOREIGN PATENT DOCUMENTS

| EP | 0 967 672 | 12/1999 |
| JP | 07-220759 | 8/1995 |
| JP | 09-147916 | 6/1997 |
| JP | 10-214640 | 8/1998 |
| JP | 10-255818 | 9/1998 |
| JP | 2000-195500 | 7/2000 |
| JP | 2002-008730 | 1/2002 |
| JP | 2003-208918 | 7/2003 |
| JP | 2004-6275 A | 1/2004 |

* cited by examiner

LITHIUM ION SECONDARY BATTERY AND METHOD FOR MANUFACTURING SAME

RELATED APPLICATION

This application is a national phase of PCT/JP2005/008690 filed on May 12, 2005, which claims priority from Japanese Application No. 2004-154510 which was filed on May 25, 2004, the disclosures of which Applications are incorporated by reference herein. The benefit of the filing and priority dates of the International and Japanese Applications is respectfully requested.

TECHNICAL FIELD

The present invention relates to a lithium ion secondary battery with excellent thermal stability during overcharge and a production method thereof.

BACKGROUND ART

Recently, small and light-weight portable appliances have been widely used, and lithium ion secondary batteries used as the power source of such appliances are required to have excellent safety and reliability, as well as high energy density.

When a sharp conductive object, for example, a nail, pierces a lithium ion battery, or when a conductive foreign matter, for example, large iron particles are undesirably included in a lithium ion battery in a production process thereof, the battery shorts out internally, thereby becoming overheated due to its high energy density. In the case of using singly a microporous thin film sheet made of polyolefin, such as polyethylene, as a separator in consideration of only the electrolyte-retaining ability, a problem occurs since the microporous thin film sheet shrinks due to heat at relatively low temperatures. That is, such heat shrinkage expands the internally shorted portion and induces further overheating.

As a technique to improve safety against short-circuiting, there has been proposed a method of forming a porous film on an electrode (see Patent document 1). Also, there has been a proposal to improve discharge capacity by using a porous film as an electrolyte-retaining layer (see Patent document 2).

Patent document 1: Japanese Laid-Open Patent Publication No. Hei 7-220759
Patent document 2: Japanese Laid-Open Patent Publication No. 2002-8730

Using a prior art porous film in combination with a microporous thin film sheet can suppress overheating due to internal short-circuiting. However, it cannot suppress overheating due to overcharge beyond design capacity.

Overcharge is detailed below. In the event of a failure of a charging circuit, the charging of a battery is not finished even if its design capacity is exceeded, thereby causing an overcharge reaction. Due to the overcharge reaction, lithium is excessively released from the positive electrode active material. In the case of $LiCoO_2$, in particular, the crystal structure of the active material is destroyed and a large heat is generated, so that the whole battery is significantly overheated.

In order to suppress overheating due to overcharge, mainly two methods are available. One is a method of closing the pores of a separator by melting at a relatively low temperature, to eliminate its ionic conductivity. The other is a method of intentionally forming a partially short-circuited portion between positive and negative electrodes, to replace a seemingly overcharge current with a short-circuit current. The latter method is carried out by utilizing deposition of a conductive chemical species, specifically, lithium needle-like crystal (dendrite) deposited on the negative electrode, or transition metal deposited from the positive electrode active material on the negative electrode.

However, a conventional porous film is uniformly formed on the flat surface of the electrode active material layer, and the electrode reactivity therefore becomes uniform. Although this is a preferable mode in the ordinary charge/discharge range, it is not so in terms of suppressing overcharge reaction. Since the formation of a short-circuited portion by a conductive deposit occurs after the overcharge reaction has proceeded to a considerable extent in the whole electrode, it is impossible to suppress overheating.

DISCLOSURE OF INVENTION

Problem that the Invention is to Solve

The present invention solves the above-mentioned problems and intends to provide a lithium ion secondary battery having improved safety against internal short-circuiting and capable of avoiding overcharge reaction from proceeding by depositing the above-mentioned conductive chemical species when the overcharge reaction is still in an early stage.

Means for Solving the Problem

The present invention relates to a lithium secondary battery including a positive electrode comprising a composite lithium oxide, a negative electrode comprising a material capable of reversibly absorbing and desorbing lithium, and a non-aqueous electrolyte, in which a common separator is provided for separating the positive electrode from the negative electrode, or in which a separator is not provided. At least one of the positive electrode and the negative electrode has a porous film, comprising an inorganic oxide filler and a binder, on the surface facing the other electrode, and the electrode surface having the porous film partially has a protruded part.

Further, the present invention is directed to a lithium ion secondary battery including a positive electrode comprising a composite lithium oxide, a negative electrode, a separator, and a non-aqueous electrolyte. The separator has a porous film, comprising an inorganic oxide filler and a binder, on at least one surface thereof, and the porous film partially has a protruded part.

The present invention also provides a lithium ion secondary battery including a positive electrode comprising a composite lithium oxide, a negative electrode, and a non-aqueous electrolyte, in which a common separator is provided for separating the positive electrode from the negative electrode, or in which a separator is not provided. One of the positive electrode and the negative electrode has a flat porous film, comprising an inorganic oxide filler and a binder, on the surface facing the other electrode, and the electrode mixture layer of the other electrode partially has a protruded part on the surface facing the one electrode.

The present invention further provides a lithium ion secondary battery including a positive electrode comprising a composite lithium oxide, a negative electrode, a separator, and a non-aqueous electrolyte. The separator has a porous film, comprising an inorganic oxide filler and a binder, on at least one surface thereof, and the electrode mixture layer of the electrode facing the porous film partially has a protruded part on the surface thereof.

Effects of the Invention

The present invention can provide a lithium ion secondary battery with improved safety against both internal short-circuiting and overcharge.

BEST MODE FOR CARRYING OUT THE INVENTION

Figure 1A:
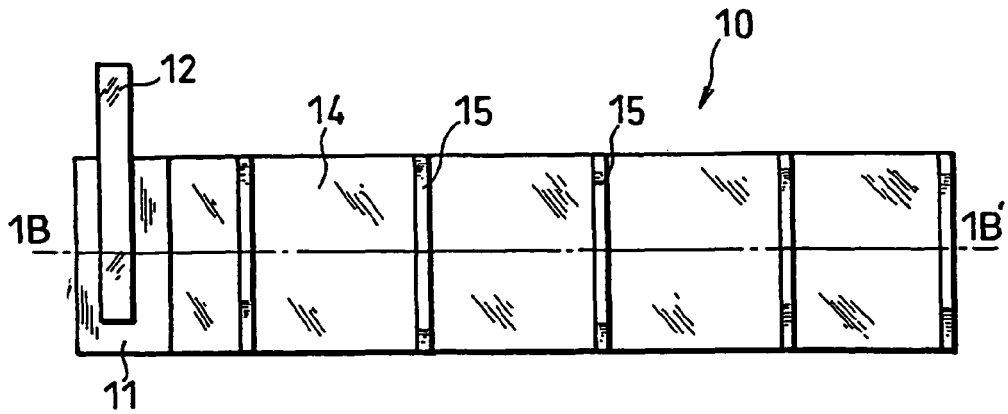
FIG. 1A is a plan view of an electrode plate in one example of the present invention.

In the lithium ion secondary battery according to the present invention, at least one of the positive electrode and the negative electrode has a porous film, comprising an inorganic oxide filler and a binder, on the surface facing the other electrode, and the electrode surface having the porous film partially has a protruded part.

In a preferable embodiment, the protruded part comprises a protruded part that is partially formed on the surface of the porous film.

A method for producing such an electrode comprises the steps of: applying a slurry for forming the porous film onto a surface of an electrode mixture layer that comprises an electrode active material, a conductive agent and a binder and drying the slurry to form the porous film; and applying the slurry for forming the porous film onto the porous film in a predetermined pattern and drying the slurry to form the protruded part.

Another method for producing such an electrode comprises the step of applying a slurry for forming the porous film onto a surface of an electrode mixture layer comprising an electrode active material, a conductive agent and a binder, for example, by a die coater process while partially increasing the amount of the slurry applied, to form the porous film partially having the protruded part.

In another preferable embodiment, the electrode mixture layer of the electrode having the porous film partially has the protruded part.

A method for producing this electrode comprises the steps of: inscribing the protruded part on a surface of an electrode mixture layer comprising an electrode active material, a conductive agent and a binder; and applying a slurry for forming the porous film on the surface of the electrode mixture layer inscribed with the protruded part and drying the slurry.

In another embodiment of the present invention, one of the positive electrode and the negative electrode has a flat porous film, comprising an inorganic oxide filler and a binder, on the surface facing the other electrode, and the electrode mixture layer of the other electrode partially has a protruded part on the surface facing the one electrode.

According to the present invention, a gap is created between the protruded part of the porous film or the electrode and the opposing electrode. Since this gap can retain more electrolyte than the other parts, exchange of ions is promoted. Upon overcharge, the overcharge reaction proceeds intensively in this part, so that while the overcharge of the overall battery is still in an early stage, deposition of a conductive chemical species occurs. Hence, the proceeding of overcharge is suppressed, and the problem of overheating can be avoided.

Further, incorporation of a material that produces a conductive polymer at a high potential or temperature upon overcharge into a battery can accelerate the deposition timing of the conductive chemical species.

It should be noted that the above-described operational effects are produced even when the porous film is formed on the separator, not the electrode.

Embodiments of the present invention are hereinafter described, but they are not to be construed as limiting in any way the present invention.

First, the porous film, which is the main constituent element of the present invention, is described.

The filler used in the porous film is an insulating inorganic oxide. Also, various resin fine particles are commonly used as the filler. However, the filler needs to have not only the above-mentioned heat resistance but also high electrochemical stability in the operational range of the lithium ion battery and high insolubility in electrolytes. An inorganic oxide is selected as a material that satisfies these requirements and is suitable for forming a slurry. Specific examples include alumina powder, silica powder, etc. Alumina is particularly suitable in terms of electrochemical stability.

The content of the inorganic oxide in the porous film is preferably not less than 50% by weight and not more than 99% by weight. In the case of excessive binder in which the inorganic oxide content is less than 50% by weight, it is difficult to control the pore structure that is formed by gaps among the inorganic oxide particles. In the case of insufficient binder in which the inorganic oxide content is more than 99% by weight, adhesion of the porous film to an electrode degrades, so that the porous film separates and loses its function. A combination of a plurality of inorganic oxides may be used. Alternatively, a plurality of porous films each comprising a different inorganic oxide may be used. Particularly, the use of a combination of inorganic oxides that are of the same kind but have different median diameters is a preferable mode in terms of obtaining a denser porous film.

The binder for holding the filler of the porous film is not particularly limited as long as it is stable at the potential of an electrode on which the porous film is formed. Usually, those used for the positive electrode or negative electrode can be used.

With respect to the thickness of the porous film, there is no particular limitation. In the case of having no separator between the positive and negative electrodes, it is preferably 0.5 to 30 μm in terms of maintaining design capacity while exhibiting the above-mentioned advantages of the porous film. It is more preferably 1 to 20 µm. Also, in the case of having a separator, the total thickness of the separator and the porous film is preferably 5.5 to 60 µm, and more preferably 9 to 45 µm. When the porous film itself partially has a protruded part, the thickness of the porous film as used herein refers to an average value excluding the protruded part. The thickness can be measured by means of a thickness gauge, a surface roughness measuring device, an SEM photo of an electrode section, etc.

In order to improve stability during overcharge, which is the effect of the present invention, it is necessary to form a gap between the electrodes such that the gap can retain more electrolyte than the other portions. The gap is formed by a partially protruded part, and its height is preferably 1 to 20 µm. This can be carried out by the following three methods.

The first method is a method of bonding/forming a porous film that partially has a protruded part to/on at least one of the positive electrode and the negative electrode or the separator. A method for partially forming a protruded part on a porous film is a method of forming a common flat porous film by means of a die coater, a gravure coater or the like, and then forming a protruded part on the porous film by means of, similarly, a die coater or a gravure coater, or intaglio transfer printing or screen printing. There is also a method of applying a slurry for forming a porous film onto a flat electrode mixture layer or separator by means of a die coater while increasing the amount of the slurry applied in pulses, to form a porous film partially having a protruded part.

The second method is a method of partially forming a protruded part on the electrode mixture layer of at least one of the positive electrode and the negative electrode, and then bonding/forming a porous film of an almost uniform thickness along the irregular surface of the electrode mixture layer having the protruded part, so as to produce an electrode integrated with the porous film that partially has the protruded part. Methods for partially forming a protruded part on an electrode mixture layer include rolling and inscription by means of a rotary roller with an irregular surface. The irregular surface of the rotary roller may be, for example, matte, roughened, grooved (having grooves that are, for example, parallel, perpendicular, or diagonal to the rotation direction), embossed, honeycombed, or ridged. Also, exemplary materials of the reduction roller surface include metal, ceramics, rubber, etc. Further, an intaglio film may be provided between the roller and an electrode, to partially form a protruded part.

The third method is a method of bonding/forming a flat porous film to/on one of the positive electrode and the negative electrode or the separator, and partially form a protruded part on the electrode mixture layer facing the porous film. As the method for forming a flat porous film, the above-mentioned first method can be used. As the method for partially forming a protruded part on the electrode mixture layer, the above-mentioned second method can be used.

With respect to the pattern of the protruded part, either of the protruded part and the relatively depressed part may form a larger proportion. Also, its position on the plane of the electrode plate, its shape, and its design may not be limited. Specific patterns of the protruded and depressed parts are shown in FIGS. 1 to 5.

Figure 1B:
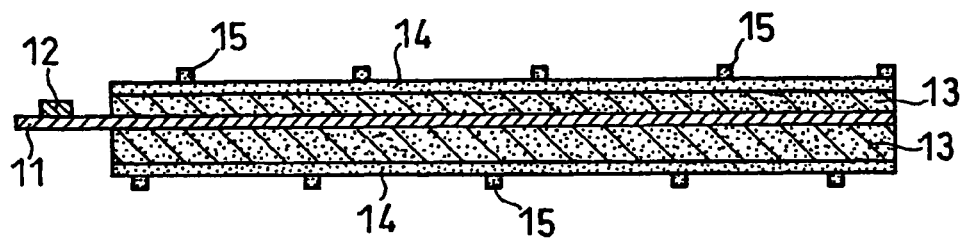
FIG. 1B is a cross-sectional view taken along line 1B-1B' of FIG. 1A.

An electrode plate 10 as illustrated in FIG. 1A and FIG. 1B is an example in which a porous film 14 having protruded parts 15 is formed on the surface of each electrode mixture layer 13. As explained above, after the porous film is formed, the protruded parts may be formed; alternatively, the porous film may be formed so as to be integrated with the protruded parts. The protruded parts 15 are equally spaced in the longitudinal direction of the electrode plate. Numeral 11 represents an electrode core member, and 12 denotes a current-collecting lead.

Figure 2A:
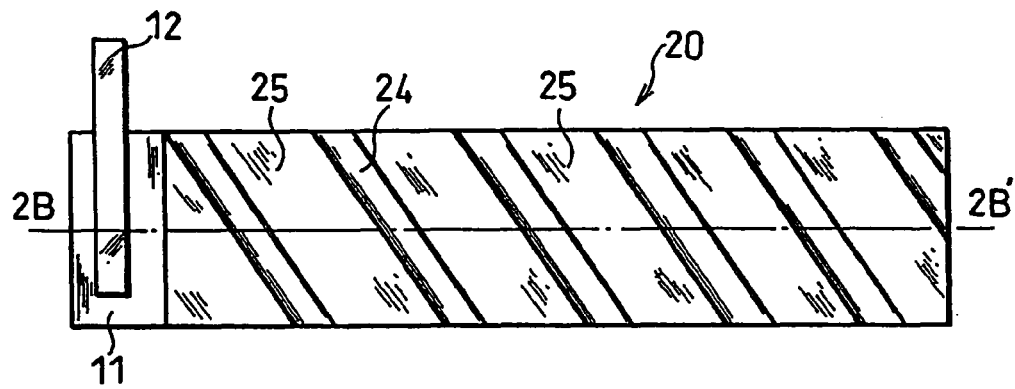
FIG. 2A is a plan view of an electrode plate in another example of the present invention.
Figure 2B:
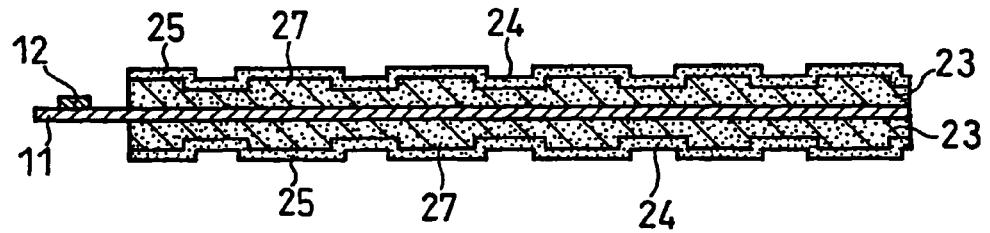
FIG. 2B is a cross-sectional view taken along line 2B-2B' of FIG. 2A.

An electrode plate 20 as illustrated in FIG. 2A and FIG. 2B is an example in which protruded parts 27 are formed on each electrode mixture layer 23 and a porous film 24 with almost the same thickness is formed on the electrode mixture layer 23. Parts 25 corresponding to the protruded parts of the electrode mixture layer 23 serve as protruded parts.

Figure 3A:
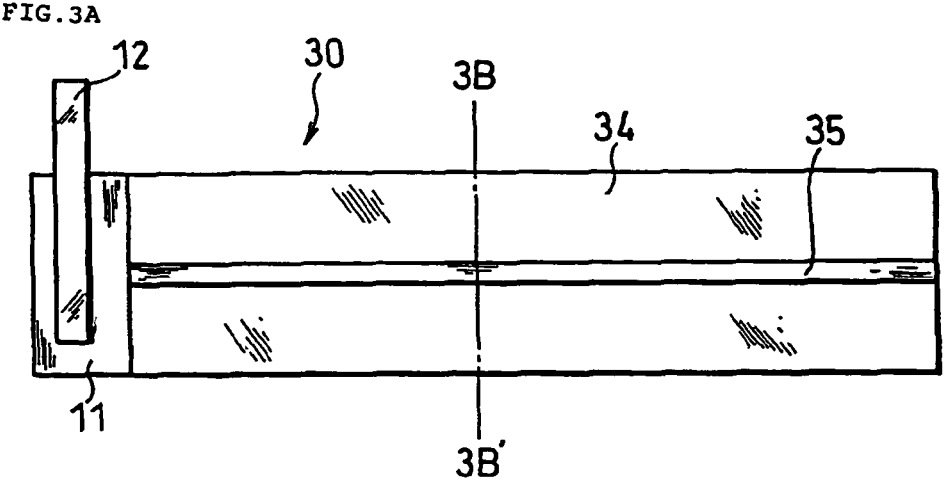
FIG. 3A is a plan view of an electrode plate in still another example of the present invention.
Figure 3B:
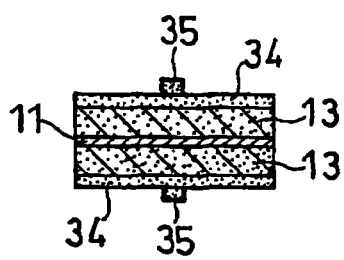
FIG. 3B is a cross-sectional view taken along line 3B-3B' of FIG. 3A.

An electrode plate 30 as illustrated in FIG. 3A and FIG. 3B is an example in which a porous film 34 having a protruded part 35 that extends in the longitudinal direction of the electrode is formed on each electrode mixture layer 13.

Figure 4A:
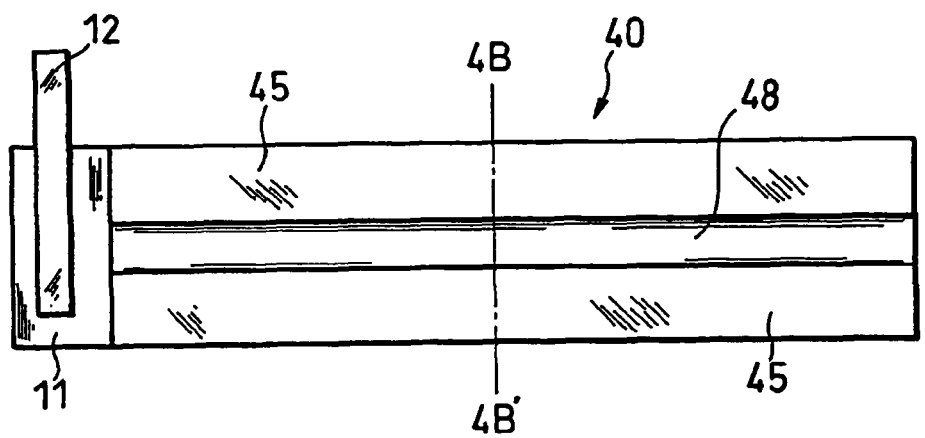
FIG. 4A is a plan view of an electrode plate in another example of the present invention.
Figure 4B:
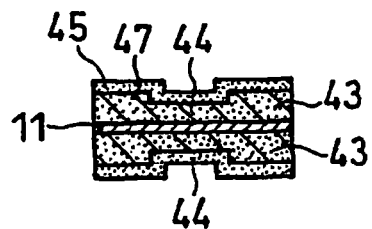
FIG. 4B is a cross-sectional view taken along line 4B-4B' line of FIG. 4A.

An electrode plate 40 as illustrated in FIG. 4A and FIG. 4B is an example in which protruded parts 47 extending in the longitudinal direction are formed on each electrode mixture layer 43 and a porous film 44 is formed on the electrode mixture layer. Parts corresponding to the protruded parts of the electrode mixture layer 43 serve as protruded parts 45.

Figure 5A:
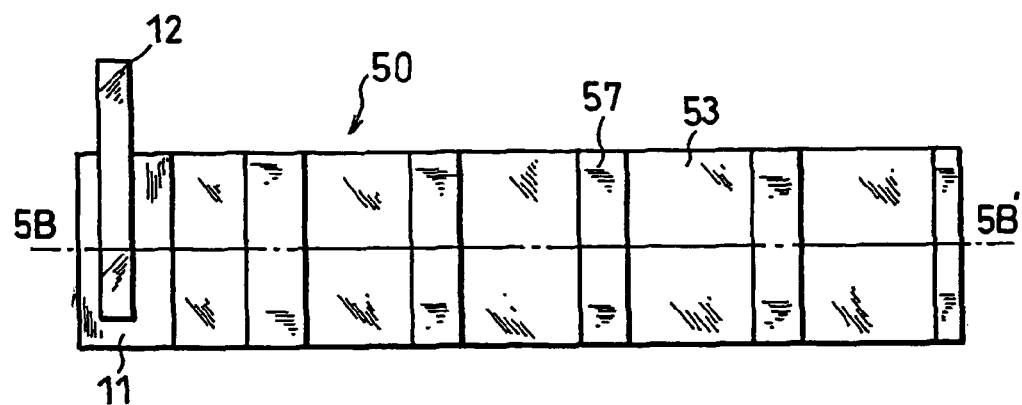
FIG. 5A is a plan view of an electrode plate in still another example of the present invention.
Figure 5B:
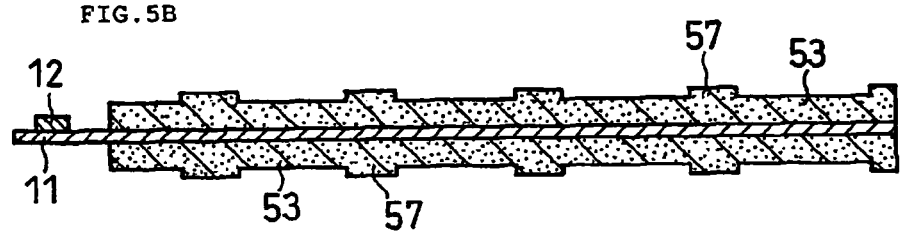
FIG. 5B is a cross-sectional view taken along line 5B-5B' of FIG. 5A.
Figure 6:
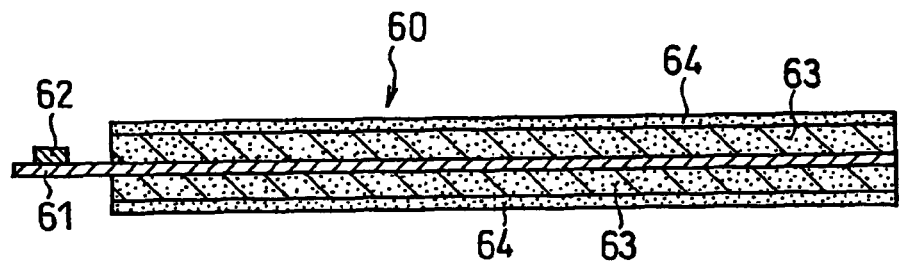
FIG. 6 is a plan view of an electrode plate in still another example of the present invention.

An electrode plate 50 as illustrated in FIG. 5A and FIG. 5B is an example in which protruded parts 57 are equally spaced on each electrode mixture layer 53 in the longitudinal direction. This electrode plate 50 is used as an electrode to be combined with an electrode plate 60 in which a uniform porous film 64 is formed on each electrode mixture layer 63, as illustrated in FIG. 6. In FIG. 6, 61 represents an electrode core member, and 62 denotes a current-collecting lead.

Exemplary positive electrode active materials used in the present invention include composite oxides, such as lithium cobaltate and modified lithium cobaltate, for example, solid solution including aluminum or magnesium dissolved therein, lithium nickelate and modified lithium nickelate, for example, those in which part of nickel is replaced with cobalt, and lithium manganate and modified lithium manganate. An exemplary binder is a combination of polytetrafluoroethylene or modified acrylonitrile rubber particle binder (e.g., BM-500B available from Zeon Corporation) with a thickener such as carboxymethyl cellulose, polyethylene oxide, or soluble modified acrylonitrile rubber (e.g., BM-720H available from Zeon Corporation). Also, polyvinylidene fluoride and modified polyvinylidene fluoride, each having both binding and thickening properties, may be used as the binder singly or in combination. With respect to the conductive agent, acetylene black, ketjen black, and various graphites may be used singly or in combination.

Exemplary negative electrode active materials that may be used include various natural graphites, artificial graphites, silicon-based composite materials such as silicide, and various alloy-composition materials containing, for example, tin. Various binders, including polyvinylidene fluoride and modified polyvinylidene fluoride, may be used. In terms of improving lithium-ion acceptability, it is more preferred to use SBR and modified SBR in combination with a cellulose-based resin such as carboxymethyl cellulose, or to add a small amount thereof thereto.

The separator is not particularly limited as long as it has a composition capable of withstanding the operation of the lithium ion battery. It is common to use a microporous film composed of olefin-type resin, such as polyethylene or polypropylene, singly or to use such microporous films in combination. Although the thickness of the separator is not particularly limited, it is preferably 5 to 30 µm in terms of maintaining design capacity while exhibiting the above-mentioned advantage of the porous film. It is more preferably 8 to 25 µm.

For forming a short-circuited portion, it is more effective to add an overcharge protection additive, such as a cycloalkyl benzene derivative, to the electrolyte, such that during overcharge, the additive is decomposed into conductive products which penetrate the separator and cause a micro short-circuit.

For the electrolyte, various lithium salts, such as $LiPF_6$ and $LiBF_4$, may be used as the solute. As the solvent, ethylene carbonate, dimethyl carbonate, diethyl carbonate, methyl ethyl carbonate and the like may be used singly or in combination. Further, it is also possible to add vinylene carbonate or modified vinylene carbonate, in order to form a good film on the positive and negative electrodes.

In order to improve safety during overcharge, which is the characteristics of the present invention, it is effective to add cyclohexyl benzene, biphenyl, diphenyl ether, cyclopentyl benzene, pyrrole, N-methyl pyrrole, thiophene, furan, indole, 3-chlorothiophene, 3-bromothiophene, 3-fluorothiophene, 1,2-dimethoxy benzene, 1-methyl-3-pyridinium tetrafluoroborate, cumene, 1,3-diisopropyl benzene, 1,4-diisopropyl benzene, 1-methyl propyl benzene, 1,3-bis(1-methyl propyl) benzene, 1,4-bis(1-methyl propyl)benzene, or the like to the electrolyte. Since these compounds are decomposed during overcharge and have the action of promoting deposition of a conductive chemical species between the positive and negative electrodes, they are preferable in terms of making the effects of the present invention prominent.

EXAMPLES

Examples of the present invention are hereinafter described.

Comparative Example 1

First, a positive electrode plate was produced as follows.

3 kg of lithium cobaltate, 1 kg of a N-methyl-2-pyrrolidone (hereinafter referred to as NMP) solution of polyvinylidene fluoride (PVDF #1320 available from Kureha Chemical Industry Co., Ltd., solid content: 12% by weight), 90 g of acetylene black and a suitable amount of NMP were stirred with a double-arm kneader, to form a positive electrode mixture slurry. This slurry was applied onto both sides of a 15-µm thick aluminum foil, followed by drying. The resultant foil was rolled such that the total thickness would be 160 µm and then cut to a width and length such that it could be inserted into a 18650 case for a cylindrical battery having a diameter of 18 mm and a height of 65 mm, to obtain a positive electrode plate.

A negative electrode plate was produced as follows. 3 kg of artificial graphite, 75 g of styrene-butadiene copolymer rubber particle binder (BM-400B available from Zeon Corporation (solid content 40% by weight)), 30 g of carboxymethyl cellulose and a suitable amount of water were stirred with a double-arm kneader, to form a negative electrode slurry. This slurry was applied onto both sides of a 10-µm thick copper foil, followed by drying. The resultant foil was rolled such that the total thickness would be 180 µm and then cut to a width and length such that it could be inserted into the 18650 cylindrical battery case, to obtain a negative electrode plate.

These positive and negative electrode plates were spirally wound with a 20-µm thick separator made of a polyethylene microporous film and then inserted into the battery case. Subsequently, 5.5 g of an electrolyte, obtained by dissolving $LiPF_6$ at 1 mol/l in a solvent mixture of ethylene carbonate and ethyl methyl carbonate in a volume ratio of 1:3, was injected therein, to produce a 18650 cylindrical lithium ion battery.

Comparative Example 2

970 g of alumina with a median diameter of 0.3 µm, 375 g of polyacrylonitrile modified rubber binder (BM-720H available from Zeon Corporation (solid content 8% by weight)) and a suitable amount of NMP were stirred with a double-arm kneader, to form a slurry for porous film. This slurry was applied onto each positive electrode mixture of Comparative Example 1 in a thickness of 5 µm per one side by means of a gravure coater, as illustrated in FIG. 6, followed by drying. Except for this, in the same manner as in Comparative Example 1, a battery was produced.

Comparative Example 3

The slurry for porous film of Comparative Example 2 was applied onto each negative electrode mixture of Comparative Example 1 in a thickness of 5 µm per one side by means of a gravure coater, followed by drying. Except for this, in the same manner as in Comparative Example 1, a battery was produced.

Example 1

The above-mentioned slurry for porous film was intermittently applied onto each porous film that was formed on the positive electrode in Comparative Example 2 in a thickness of 5 µm and a width of 1 cm and at application pitches of 10 cm, to partially form protruded parts on the porous film, as illustrated in FIG. 1A and FIG. 1B. A battery was produced in the same manner as in Comparative Example 1 except for the use of this positive electrode.

Example 2

The above-mentioned slurry for porous film was intermittently applied onto each porous film that was formed on the negative electrode in Comparative Example 3 in a thickness of 5 µm and a width of 1 cm and at application pitches of 10 cm, to partially form protruded parts on the porous film, as illustrated in FIG. 1A and FIG. 1B. A battery was produced in the same manner as in Comparative Example 1 except for the use of this negative electrode.

Example 3

The above-mentioned slurry for porous film was applied onto the negative electrode produced in Comparative Example 1 by means of a die coater while the amount of the slurry applied was increased in pulses, to form a porous film partially having protruded parts as illustrated in FIG. 1A and FIG. 1B. A battery was produced in the same manner as in Comparative Example 1 except for the use of this negative electrode.

Example 4

In rolling the positive electrode plate produced in Comparative Example 1, rotary reduction rollers with grooves were used. As a result, protruded parts of approximately 5 µm in height were formed on each electrode mixture layer, as illustrated in FIG. 2A and FIG. 2B. The protruded parts were formed in a width of 1.5 cm and at pitches of 9.5 cm. The above-mentioned slurry for porous film was applied thereon in a thickness of 5 μm, to partially form protruded parts. A battery was produced in the same manner as in Comparative Example 1 except for the use of this positive electrode plate.

Example 5

In rolling the negative electrode plate produced in Comparative Example 1, rotary reduction rollers with grooves were used. As a result, protruded parts of approximately 7 μm in height were formed on each electrode mixture layer, as illustrated in FIG. 2A and FIG. 2B. The protruded parts were formed in a width of 1.5 cm and at pitches of 9.5 cm. The above-mentioned slurry for porous film was applied thereon in a thickness of 5 μm, to partially form protruded parts. A battery was produced in the same manner as in Comparative Example 1 except for the use of this negative electrode plate.

Example 6

A battery was produced in the same manner as in Comparative Example 1, except for the use of a positive electrode plate as illustrated in FIG. 6, on which flat porous films were formed in the same manner as in Comparative Example 2, and the use of a negative electrode plate as illustrated in FIG. 5A and FIG. 5B, in which approximately 7-μm high protruded parts were formed on each electrode mixture layer by means of rotary reduction rollers with grooves in the same manner as in Example 4.

Example 7

A battery was produced in the same manner as in Comparative Example 1, except for the use of a negative electrode plate on which flat porous film layers were formed in the same manner as in Comparative Example 3, and the use of a positive electrode plate in which approximately 5-μm high protruded parts were formed on each electrode mixture layer by means of rotary reduction rollers with grooves in the same manner as in Example 3.

Examples 8 to 14

Batteries were produced, using electrode plates that were produced in the same manner as in Examples 1 to 7. However, an electrolyte was prepared by dissolving 0.5 wt % cyclohexyl benzene and 1 mol/l $LiPF_6$ in a solvent mixture of ethylene carbonate and ethyl methyl carbonate in a volume ratio of 1:3. These batteries were designated as Examples 8 to 14.

Example 15

The slurry for porous film of Comparative Example 2 was applied onto each negative electrode mixture of Comparative Example 1 in a thickness of 10 μm per one side by means of a gravure coater, followed by drying. In the same manner as in Example 2, the same slurry for porous film was applied onto the resultant porous film, to partially form protruded parts, as illustrated in FIG. 1A and FIG. 1B. A battery was produced in the same manner as in Comparative Example 1, except for the use of this negative electrode and the omission of the separator.

Example 16

A battery was produced in the same manner as in Example 15, except that the thickness of the porous film per one side was changed to 15 μm.

Example 17

A battery was produced in the same manner as in Example 15, except that the thickness of the porous film per one side was changed to 20 μm.

Example 18

A battery was produced in the same manner as in Example 15, except that the thickness of the porous film per one side was changed to 20 μm.

Example 19

A battery was produced in the same manner as in Example 15, except that the thickness of the porous film per one side was changed to 30 μm.

Example 20

A battery was produced in the same manner as in Example 5, except that the thickness of the porous film formed on each negative electrode mixture layer with the protruded parts was changed to 20 μm per one side and that the separator was omitted.

Example 21

The thickness of the dried porous film formed on each positive electrode mixture of Comparative Example 2 was changed to 20 μm per one side. The same slurry for porous film was applied onto this positive electrode, to partially form protruded parts. A battery was produced in the same manner as in Comparative Example 1, except for the use of this positive electrode and the omission of the separator.

Example 22

The slurry for porous film of Comparative Example 2 was applied onto one side of a 20-μm thick separator made of a polyethylene microporous film in a thickness of 20 μm by means of a gravure coater, followed by drying. The same slurry for porous film was intermittently applied onto the porous film of this separator in a thickness of 5 μm and a width of 1 cm and at application pitches of 10 cm, to partially form protruded parts on the porous film. This separator was interposed between the positive and negative electrodes such that its porous film faced the positive electrode, and this was spirally wound. Except for this, in the same manner as in Comparative Example 1, a battery was produced.

It should be noted that the porous film of the separator may be provided so as to face the negative electrode.

Example 23

The slurry for porous film of Comparative Example 2 was applied onto one side of a 20-μm thick separator made of a polyethylene microporous film in a thickness of 20 μm by means of a gravure coater, followed by drying. Further, the positive electrode plate with the protruded parts, produced in Example 7, was used, and the porous film of the separator was opposed to this positive electrode in spirally winding the electrodes. Except for this, in the same manner as in Comparative Example 1, a battery was produced.

The thicknesses of the depressed parts of the electrodes and the porous films used in the Comparative Examples and Examples were determined, using an SEM image which was taken by embedding an electrode plate into epoxy resin, cutting it, and polishing the cut section. All the 18650 cylindrical batteries thus produced had a capacity of approximately 1750 mAh.

First, each of these batteries was subjected to 3 cycles of charge/discharge at a constant current of 350 mA in the voltage range of 3.0 to 4.2 V. When the battery was discharged down to 3.0 V, it was subjected to an overcharge test. In this test, the battery was continuously overcharged at a constant current of 1225 mA in an ambient temperature of 25° C. for 3 hours. Commercially available batteries include, as a safety mechanism, a sealing plate equipped with a current interrupting device (CID) that is actuated by temperature, inner pressure or the like. The effects were compared in terms of whether or not the CID was actuated, the charge depth at which the voltage drop started, and the highest temperature of the battery during the test. Table 1 shows the results.

TABLE 1

| | Battery capacity (mAh) | Charge depth at which voltage drop started (%) | Highest temperature (° C.) | CID actuation |
|---|---|---|---|---|
| Comparative example 1 | 1747 | 165 | 68 | Actuated |
| Comparative example 2 | 1751 | 163 | 66 | Actuated |
| Comparative example 3 | 1750 | 164 | 67 | Actuated |
| Example 1 | 1748 | 137 | 52 | Not actuated |
| Example 2 | 1749 | 135 | 50 | Not actuated |
| Example 3 | 1751 | 140 | 53 | Not actuated |
| Example 4 | 1750 | 138 | 49 | Not actuated |
| Example 5 | 1750 | 134 | 48 | Not actuated |
| Example 6 | 1748 | 133 | 47 | Not actuated |
| Example 7 | 1747 | 128 | 45 | Not actuated |
| Example 8 | 1749 | 127 | 44 | Not actuated |
| Example 9 | 1748 | 130 | 48 | Not actuated |
| Example 10 | 1748 | 126 | 44 | Not actuated |
| Example 11 | 1749 | 125 | 44 | Not actuated |
| Example 12 | 1747 | 127 | 46 | Not actuated |
| Example 13 | 1747 | 126 | 44 | Not actuated |
| Example 14 | 1748 | 125 | 44 | Not actuated |
| Example 15 | 1749 | 125 | 44 | Not actuated |
| Example 16 | 1750 | 127 | 46 | Not actuated |
| Example 17 | 1748 | 130 | 48 | Not actuated |
| Example 18 | 1750 | 129 | 48 | Not actuated |
| Example 19 | 1751 | 135 | 50 | Not actuated |
| Example 20 | 1750 | 130 | 47 | Not actuated |
| Example 21 | 1747 | 131 | 48 | Not actuated |
| Example 22 | 1750 | 134 | 51 | Not actuated |
| Example 23 | 1749 | 133 | 50 | Not actuated |

Figure 7:
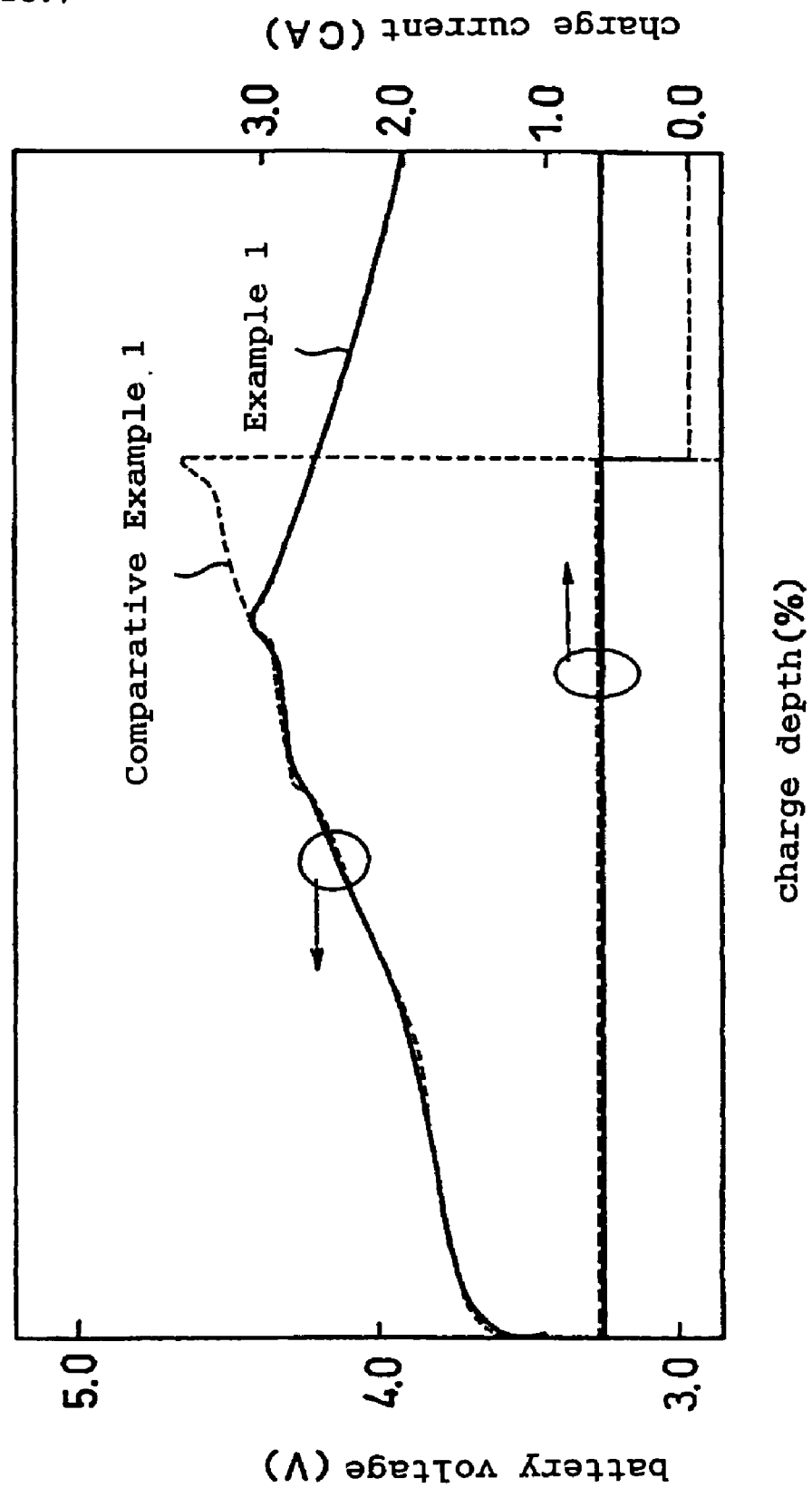
FIG. 7 is a graph showing changes over time in battery voltage and charge current in an overcharge test of batteries of an example of the present invention and a comparative example.

Exemplary voltage behavior and temperature behavior during the 3-hour continuous overcharge test are described with reference to FIG. 7. The battery of Example 1 caused an internal short-circuit and hence a voltage drop at a shallower overcharge depth than the battery of Comparative Example 1. This is proof that deposition of a conductive chemical species between the positive and negative electrodes caused an internal short-circuit, as described above. That is, by intentionally causing an internal short-circuit during overcharge, an excessive rise in battery temperature can be suppressed. Accordingly, it is possible to avoid a high-voltage and high-temperature range that promotes electrolyte decomposition, thereby ensuring safety during overcharge while leaving the CID, i.e., physical circuit shut-off, as the last means.

The results of Table 1 demonstrate such difference. In Examples 1 to 14, since their highest temperatures were mostly 55° C. or lower, the actuation of the CID could be avoided. In contrast, in Comparative Examples 1 to 3, since their highest temperatures were mostly higher than 65° C., the overcharge had to be stopped with the help of the CID as the last means.

These results have clearly indicated that the present invention can provide a lithium ion secondary battery with improved safety and reliability during overcharge.

INDUSTRIAL APPLICABILITY

The lithium ion secondary battery according to the present invention is particularly useful as a portable power source that is required to have a high level of safety.

The invention claimed is:
1. A lithium ion secondary battery comprising:
  a positive electrode comprising a composite lithium oxide;
  a negative electrode; and
  a non-aqueous electrolyte,
  wherein at least one of said positive electrode and said negative electrode has a porous film, comprising an inorganic oxide filler and a binder, on the surface facing the other electrode, and said electrode surface having the porous film partially has a protruded part, the ratio of the electrode surface having the protruded part being between $1/10$ and $1.5/9.5$.
2. The lithium ion secondary battery in accordance with claim 1, further comprising a separator between said positive electrode and said negative electrode.
3. The lithium ion secondary battery in accordance with claim 1, wherein said protruded part comprises a protruded part that is partially formed on the surface of said porous film.
4. The lithium ion secondary battery in accordance with claim 1 wherein said electrode having the porous film has an electrode mixture layer that partially has a protruded part.
5. A method for producing the lithium ion secondary battery of claim 3, comprising the steps of: applying a slurry for forming the porous film onto a surface of an electrode mixture layer that comprises an electrode active material, a conductive agent and a binder and drying the slurry to form the porous film; and
  applying the slurry for forming the porous film onto said porous film in a predetermined pattern and drying the slurry to form the protruded part.
6. A method for producing the lithium ion secondary battery of claim 3, comprising the step of applying a slurry for forming the porous film onto a surface of an electrode mixture layer that comprises an electrode active material, a conductive agent and a binder by a die coater process while partially increasing the amount of the slurry applied, to form the porous film partially having the protruded part.
7. A method for producing the lithium ion secondary battery of claim 4, comprising the steps of:
  inscribing the protruded part on a surface of an electrode mixture layer comprising an electrode active material, a conductive agent and a binder; and
  applying a slurry for forming the porous film onto the surface of the electrode mixture layer inscribed with said protruded part and drying the slurry to form the porous film.

* * * * *